Patented Feb. 20, 1951

2,542,111

UNITED STATES PATENT OFFICE 2,542,111

SYNTHETIC RESINS AND PREPARATION THEREOF

Herman S. Bloch, Chicago, Ill., assignor to Universal Oil Products Company, Chicago, Ill., a corporation of Delaware No Drawing. Application September 28, 1948, Serial No. 51,641

16 Claims. (Cl. 260—51)

This application is a continuation-in-part of my copending application Serial Number 611,702, now Patent No. 2,453,298, Nov. 9, 1948, filed August 20, 1945, as a continuation-in-part of application Serial Number 500,425, filed August 28, 1943, now abandoned.

This application relates to the preparation of resins suitable for use as coating compositions.

An object of this invention is the preparation of a resin by interaction of an alkylbenzene hydrocarbon, a phenol, and a dihaloalkane in the presence of a Friedel-Crafts metal halide catalyst, hydrolysis of the reaction mixture and condensation of a carbonyl compound with said hydrolysis product.

Another object of this invention is the preparation of a resin by reacting an alkylbenzene having not more than two alkyl substituents, a monohydric phenol, and a dichloride of a normally gaseous olefin in the presence of a Friedel-Crafts metal chloride catalyst, hydrolyzing the reaction product, and reacting the hydrolysis product with an aldehyde or ketone to form a resin.

In one embodiment, this invention relates to a process for producing a resin which comprises reacting in the presence of a Friedel-Crafts metal halide catalyst: (1) an alkylbenzene hydrocarbon having not more than two alkyl groups per molecule and each of said alkyl groups having not more than two carbon atoms per group, (2) a phenolic compound selected from the group consisting of monohydric phenols, dihydric phenols, and the methyl, ethyl, and prenyl ethers of said phenols, said phenolic compounds containing not more than two nuclearly substituted alkyl groups per molecule as the sole nuclear substituents and each of said alkyl groups having not more than two carbon atoms per group, and (3) a dihaloalkane having from two to four, inclusive, carbon atoms per molecule and a halogen atom of at least 35 atomic weight bound to each of two adjacent carbon atoms; the amount of catalysts being at least 5 mole per cent more than (2), the amount of (1) being at least 10 mole percent of the total of (1), (2), and (3), the molar amount of (2) being from about one-tenth to about one-half of the total of (1) and (2), and the amount of (3) being from about 1 to about 20 moles per mole of total (1) and (2); terminating the reaction when from about 1.0 to about 1.5 moles of hydrogen halide have been evolved per mole of total aromatic compounds reacted, hydrolyzing the resultant reaction product to form a mixture of an aqueous layer and organic material comprising aromatic hydrocarbon-phenolic compound-dihaloalkane reaction product, reacting said mixture with a carbonyl compound selected from the group consisting of aldehydes and ketones at a temperature of from about 60° to about 150° C., and recovering the resultant organic condensation product.

This invention is concerned particularly with the manufacture of resinous material, suitable for incorporating into coating compositions, from hydrocarbon fractions containing aromatic hydrocarbons, certain phenolic compounds, alkylene dihalides containing halogens of at least 35 atomic weight and aldehydes and ketones. Resins of this nature which are prepared in part from phenolic materials show improved solubilities in aromatic solvents as well as solvents which have chemically bound oxygen, such as esters or ethers, over the solubilities of resins derived by the condensation of dihaloalkanes with only aromatic hydrocarbons. When employed in coating compositions, the resins produced from phenols, alkylbenzene hydrocarbons, dihaloalkanes and formaldehyde or another carbonyl compound adhere well to metals and various woods and are more satisfactory and durable than the purely hydrocarbon resins.

The resins formed by my process differ markedly from those prepared previously by condensing an alkali metal or alkaline earth metal phenolate of a polyhydric phenol with an organic polyhalide whose halogen atoms are attached to aliphatic carbon atoms. In this prior art method, the alkali or alkaline earth metal of the phenolate of the mentioned polyhydric phenol combined with the halogen of the organic polyhalide and thus formed a metal halide and effected a condensation of the polyhydric phenol with the carbon chain of the organic polyhalide, forming an organic condensation product of resinous nature. Such a condensation product contains ether linkages formed by a reaction mechanism of the type:

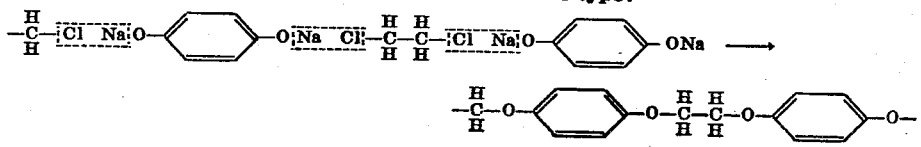

In my process, an alkylbenzene hydrocarbon, a monohydric or dihydric phenol, and a dihaloalkane are interacted in the absence of an alkaline condensing agent but in the presence of a Friedel-Crafts metal halide catalyst to form a reaction product and a hydrogen halide, the latter being evolved from the process. Accordingly, my process yields an intermediate product containing free hydroxyl groups and in which the aromatic reactants are linked to the alkylene carbon atom chain by nuclear bonds as indicated in the equation:

and/or ethyl groups. Typical phenol ethers thus include anisole, phenetole, diphenyl ether, etc.

The alkylene dihalides preferred for use in my process are produced by addition of a halogen to a gaseous monoolefinic hydrocarbon and particularly to ethylene. These dihaloalkanes contain 2, 3, and 4 carbon atoms per molecule and have a halogen atom of at least 35 atomic weight bound to each of two adjacent carbon atoms. Although dichloro-, dibromo-, and diiodo-alkanes are useful in my process, I prefer to utilize the dichloroalkanes because of their cheapness and

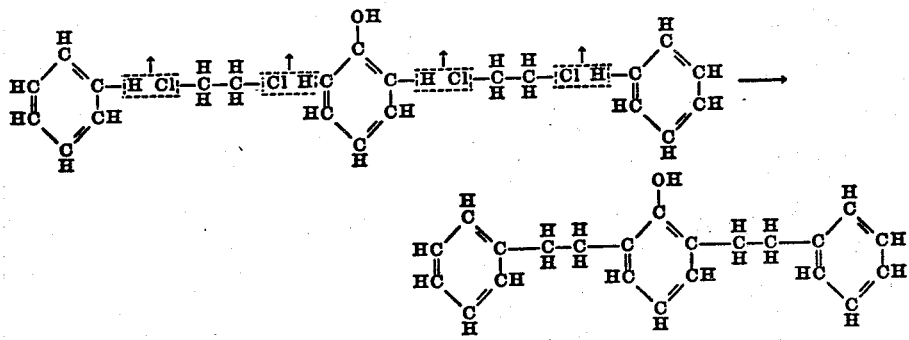

A reaction product of the alkylbenzene hydrocarbon, phenolic compound and dihaloalkane is then hydrolyzed and the resultant hydrolysis mixture containing acidic material is reacted further with a carbonyl compound selected from the group consisting of ketones and aldehydes, preferably formaldehyde.

The aromatic hydrocarbons employed in my process are alkylbenzene hydrocarbons having not more than two alkyl groups and not more than two carbon atoms in each of said alkyl groups. These alkylbenzene hydrocarbons include toluene, the xylenes, monoethylbenzene, and the diethylbenzenes. The aromatic hydrocarbons used in this process may be either the pure alkylbenzene hydrocarbons or may comprise a substantially olefin-free hydrocarbon fraction containing these aromatic hydrocarbons in admixture with paraffinic and naphthenic hydrocarbons. Suitable saturated hydrocarbon fractions containing alkylbenzene hydrocarbons may be of naphtha or gasoline boiling range, or of kerosene boiling range. If the alkyl substituents contain more than two carbon atoms, dealkylation occurs, and the olefins formed thereby undergo conjunct polymerization with the formation of undesirable by-products.

The phenolic compounds which are reacted with the other resin-forming substances as herein set forth comprise phenols and phenol ethers having per molecule not more than two oxygen atoms and not more than two nuclearly substituted alkyl groups, each of said alkyl groups containing not more than two carbon atoms. The monohydric phenols include particularly phenol, cresols, xylenols, and naphthols, and their methyl and ethyl homologues having not more than two nuclear alkyl substituents. Resorcinol, catechol, hydroquinone, and other dihydric phenols and their methyl and ethyl substituted homologues having not more than two alkyl groups are dihydric phenols which are useful in my process. Other phenolic compounds utilizable in my process for producing resins comprise methyl aryl ethers and ethyl aryl ethers producible from phenols as well as diaryl ethers wherein the aryl group is a phenyl group or a phenyl group substituted by an alkyl group having not more than two carbon atoms and thus including methyl availability. Other suitable dihaloalkanes are produced by the halogenation of paraffinic, cycloparaffinic and cycloolefinic hydrocarbons.

The use of dihaloalkanes containing from 2 to 4, inclusive, carbon atoms per molecule results in the production of hard resins, while softer resins with softening points below about 65° C. and more tarry products are formed from dihaloalkanes of higher molecular weights.

The charging stock of my process for producing resins should contain at least 10 mole per cent of the mentioned alkylbenzene hydrocarbons, while the amount of phenolic material present should be from about one-tenth to about one-half of the total molar amount of aromatic compounds, that is, alkylbenzene hydrocarbons plus phenols, present in the mixture. The preferred amount of dihaloalkane present in the reaction mixture also is about 2 to about 5 moles of dihaloalkane per mole of total alkyl aromatic hydrocarbons and phenols if pure alkyl aromatic hydrocarbons and phenols are utilized rather than hydrocarbon fractions containing these materials; but molar ratios of alkylene dihalide to aromatic compounds as low as slightly above 1 to about 20 may be used. However, if a naphtha fraction is used, it is preferable to employ the dihaloalkane in sufficient excess so that after the condensation reaction is completed, the molar ratio of the unconsumed dihaloalkane to the total of the paraffinic and naphthenic hydrocarbons present in the reaction mixture is greater than 2.

Catalysts employed in my process comprise the metal halides of the Friedel-Crafts type and include particularly aluminum chloride, aluminum bromide, ferric chloride, ferric bromide, etc. In addition to the metal halide catalysts, boron fluoride is also suitable. In general, the amount of catalyst employed is from about 5 to about 15 mole per cent more than the amount of phenolic compound charged to the reaction mixture.

In the presence of these catalysts, the condensation reaction is carried out at a temperature of from about 25° to about 200° C. and preferably at a temperature of from about 50° to about 100° C. While the condensation occurs at atmospheric pressure, it is sometimes advantageous to effect the condensation at a superatmospheric pressure. The reaction is preferably carried out for a length of time such that the amount of hydrogen halide evolved ranges from about 1.0 to about 1.5 moles per mole of total aromatics (phenols plus hydrocarbons) used. The soft resinoids formed when the amount of hydrogen chloride evolved is in the lower portion or below this range may be hardened by reaction of the resinoid, after hydrolysis of the reaction mixture with formaldehyde or similar aldehyde or ketone condensation agents. Such aldehyde condensations may be carried out in either alkaline or acid media.

Suitable ketones include such saturated members as acetone, methylethylketone, diethylketone, etc., cyclic saturated ketones such as methylcyclohexylketone, cyclic members wherein the carbonyl group is part of the ring, such as cyclohexanone, unsaturated ketones, such is vinylmethylketone, ethylidene-acetone, mesityl oxide, phorone, etc., aryl ketones such as acetophenone, butyrophenone, benzophenone, etc., and alkenyl arylketones such as propenylphenylketone and homologs of the above classes. Typical aldehydes include such compounds as formaldehyde, acetaldehyde, crotonaldehyde, benzaldehyde, cinnamaldehyde, and others.

In carrying out the process of the present invention, a mixture of an aromatic hydrocarbon or a hydrocarbon fraction containing aromatics and a phenolic compound is commingled with a molar excess of a dihaloalkane, also referred to as an alkylene dihalide, and is heated in the presence of a Friedel-Crafts metal halide catalyst, preferably aluminum chloride, until the evolution of hydrogen chloride bears a ratio of about 1.5 moles per mole of total aromatic compound employed, the total aromatic compound including both alkylbenzene hydrocarbons and phenolic compounds. The reaction mixture is then subjected to hydrolysis and the hydrolysis product is reacted further with an aldehyde or ketone such as formaldehyde. When formaldehyde is used, it is added in a molar amount approximately equal to that of the phenol charged to the process. The formaldehyde is then condensed with the phenol-aromatic hydrocarbon-alkylene dihalide reaction product in the presence of the acid-hydrolyzing medium which serves as the condensation catalyst. Any excess formaldehyde and alkylene dihalide present are removed by steam distillation and the resultant resinous material is dried.

Alternatively, the excess alkylene dihalide such as ethylene dichloride, may be removed by steam distillation before addition of the formaldehyde. It is convenient, however, to have it present as a solvent for the primary resinoid as the latter is then maintained in a more fluid state and is capable of more uniform reaction with the formaldehyde.

It is sometimes preferable to add the phenolic material to the reaction mixture after partial condensation has been effected between the aromatic hydrocarbon and the polyhaloalkane. Although less catalyst is needed when following this method of procedure, greater care is required to insure a homogeneous product having satisfactory properties.

The following examples illustrate my invention but should not be considered as limiting the broad scope of the invention in accordance therewith.

*Example I*

To an equimolecular mixture of 100 grams of xylene and phenol was added 247 grams of ethylene chloride and 84 grams of aluminum chloride. The reactants were heated at a temperature which varied from 60 to 92° C. until 1.46 mole of hydrogen chloride were evolved. After hydrolysis of the mixture, 0.5 mole of formaldehyde was reacted at 82° C. with the product from the first step. The resin formed was found to have a ball and ring softening point of 102° C. and was slightly soluble in organic solvents. After baking at 110° C., it became extremely hard and tough.

*Example II*

A mixture comprising 3 moles of xylene to one of phenol was combined with ethylene dichloride and reacted in the presence of aluminum chloride. The reaction temperature was 60° C. After 1.32 moles of hydrogen chloride per mole of total aromatics had been evolved, the product was subjected to hydrolysis and reacted with formaldehyde at 80° C., the molar ratio of formaldehyde to phenol being 1 to 1. A solid, hard, homogeneous resin was obtained which also had a softening point of 102° C. by the ball and ring method.

*Example III*

The initial resinoid was made as in Example II, but the reaction was stopped after 1.20 moles of hydrogen chloride per mole of aromatics had been liberated. After hydrolysis of the reaction mixture, the excess ethylene dichloride was removed by steam distillation. The residue was then washed several times with water, then drained free of superficial water, and finally dried at 130° C. The soft plastic mass was kneaded with slightly over 2 moles of formaldehyde per mole of phenol present (the formaldehyde being added as powdered solid paraformaldehyde) and the mixture was heated 8 hours at 90–110° C. Approximately one-third of the formaldehyde was recovered. The resinous product was a clear, homogeneous solid, softening at 65° C. (ball and ring) and soluble in glyceride drying oils, aromatic hydrocarbons and butyl acetate.

*Example IV*

A mixture of 0.5 mole of xylenes, 0.5 mole of anisole, and 2.5 moles of ethylene dichloride was heated to 60° C. and anhydrous aluminum chloride gradually in portions of approximately 0.16 mole each. No hydrogen chloride was evolved during the addition of the first three portions, which covered a period of one hour and forty minutes during which the temperature was raised from 60° to 95° C. Upon the addition of the fourth portion of catalyst (to make a total of 0.63 mole), a rapid evolution of hydrogen chloride began. The reaction was continued for 3.5 hours longer at temperatures varying between 70° and 95° C., during which 1.5 moles of hydrogen chloride was evolved. The reaction mixture was then cooled, decomposed with water, and steam-distilled. From an analysis of the steam distillate, it was determined that all of the xylenes and anisole had reacted, and that 1.09 moles of ethylene dichloride had been consumed. The resinous product was a yellowish, medium-hard solid of ball and ring softening point 96° C., relatively insoluble in mineral spirits and acetone, moderately soluble in carbon disulfide, Cellosolve, and linseed oil, and readily soluble in toluene, benzene, carbon tetrachloride and butyl acetate.

This product, when dissolved in toluene and refluxed with 1.1 moles of aqueous 35 weight per cent Formalin for two hours in the presence of five per cent of sulfuric acid, was raised in softening point to 130° C. with relatively little change in its solubility characteristics.

I claim as my invention:

1. A process for producing a resin which comprises reacting in the presence of a Friedel-Crafts metal halide catalyst: (1) an alkylbenzene hydrocarbon having not more than two alkyl groups per molecule and each of said alkyl groups having not more than two carbon atoms per group, (2) a phenolic compound selected from the group consisting of monohydric phenols, dihydric phenols, and the methyl, ethyl, and phenyl ethers of said phenols, said phenolic compounds containing not more than two nuclearly substituted alkyl groups per molecule as the sole nuclear substituents and each of said alkyl groups having not more than two carbon atoms per group, and (3) a dihaloalkane having from two to four, inclusive, carbon atoms per molecule and a halogen atom of at least 35 atomic weight bound to each of two adjacent carbon atoms; the amount of catalyst being at least 5 mole per cent more than (2), the amount of (1) being at least 10 mole percent of the total of (1), (2), and (3), the molar amount of (2) being from about one-tenth to about one-half of the total of (1) and (2), and the amount of (3) being from about 1 to about 20 moles per mole of total (1) and (2), terminating the reaction when from about 1.0 to about 1.5 moles of hydrogen halide have been evolved per mole of total aromatic compounds reacted, hydrolyzing the resultant reaction product to form a mixture of an aqueous layer and organic material comprising aromatic hydrocarbon-phenolic compound-dihaloalkane reaction product, reacting said mixture with a carbonyl compound selected from the group consisting of aldehydes and ketones at a temperature of from about 60° to about 150° C., and recovering the resultant organic condensation product.

2. A process for producing a resin which comprises reacting in the presence of a Friedel-Crafts metal halide catalyst at a temperature of from about 25° C. to about 200° C.: (1) an alkylbenzene hydrocarbon having not more than two alkyl groups per molecule and each of said alkyl groups having not more than two carbon atoms per group, (2) a phenolic compound selected from the group consisting of monohydric phenols, dihydric phenols, and the methyl, ethyl, and phenyl ethers of said phenols, said phenolic compounds containing not more than two nuclearly substituted alkyl groups per molecule as the sole nuclear substituents and each of said alkyl groups having not more than two carbon atoms per group, and (3) a dihaloalkane having from two to four, inclusive, carbon atoms per molecule and a halogen atom of at least 35 atomic weight bound to each of two adjacent carbon atoms; the amount of catalyst being at least 5 mole per cent more than (2), the amount of (1) being at least 10 mole per cent of the total of (1), (2), and (3), the molar amount of (2) being from about one-tenth to about one-half of the total of (1) and (2), and the amount of (3) being from about 1 to about 20 moles per mole of total (1) and (2), terminating the reaction when from about 1.0 to about 1.5 moles of hydrogen halide have been evolved per mole of total aromatic compounds reacted, hydrolyzing the resulting reaction product to form a mixture of an aqueous layer and organic material comprising aromatic hydrocarbon-phenolic compound - dihaloalkale reaction product, reacting said mixture with a carbonyl compound selected from the group consisting of aldehydes and ketones at a temperature of from about 60° to about 150° C., and recovering the resultant organic condensation product.

3. A process for producing a resin which comprises reacting in the presence of a Friedel-Crafts metal halide catalyst at a temperature of from about 50° C. to about 100° C.: (1) an alkylbenzene hydrocarbon having not more than two alkyl groups per molecule and each of said alkyl groups having not more than two carbon atoms per group, (2) a phenolic compound selected from the group consisting of monohydric phenols, dihydric phenols, and the methyl, ethyl, and phenyl ethers of said phenols, said phenolic compounds containing not more than two nuclearly substituted alkyl groups per molecule as the sole nuclear substituents and each of said alkyl groups having not more than two carbon atoms per group, and (3) a dihaloalkane having from two to four, inclusive, carbon atoms per molecule and a halogen atom of at least 35 atomic weight bound to each of two adjacent carbon atoms; the amount of catalyst being at least 5 mole per cent more than (2), the amount of (1) being at least 10 mole per cent of the total of (1), (2), and (3), the molar amount of (2) being from about one-tenth to about one-half of the total of (1) and (2), and the amount of (3) being from about 1 to about 20 moles per mole of total (1) and (2), terminating the reaction when from about 1.0 to about 1.5 moles of hydrogen halide have been evolved per mole of total aromatic compounds reacted, hydrolyzing the resultant reaction product to form a mixture of an aqueous layer and organic material comprising aromatic hydrocarbon-phenolic compound-dihaloalkane reaction product, reacting said mixture with a carbonyl compound selected from the group consisting of aldehydes and ketones at a temperature of from about 60° to about 150° C., and recovering the resultant organic condensation product.

4. The process defined in claim 1 further characterized in that the amount of dihaloalkane is from about two to about five moles per mole of total alkylbenzene hydrocarbon and phenolic compound.

5. The process defined in claim 1 further characterized in that said catalyst comprises aluminum chloride.

6. The process defined in claim 1 further characterized in that said dihaloalkane comprises a dichloroalkane.

7. The process defined in claim 1 further characterized in that said phenolic compound comprises a monohydric phenol.

8. The process defined in claim 1 further characterized in that said alkylbenzene comprises xylene.

9. The process defined in claim 1 further characterized in that said dihaloalkane comprises ethylene dichloride.

10. The process defined in claim 1 further characterized in that said carbonyl compound comprises an aldehyde.

11. The process defined in claim 1 further characterized in that said carbonyl compound comprises formaldehyde.

12. A process for producing a resin which comprises reacting xylene, phenol, and ethylene dichloride in the presence of aluminum chloride at a temperature of from about 50° C. to about 100° C., the amount of aluminum chloride being at least 5 mole per cent more than the molar amount of phenol, the molar amount of said xylene being at least 10% of the total reactants, the molar amount of said phenol being from about 0.1 to about 0.5 of the total aromatic reactants, and the amount of said ethylene dichloride being from above one to about 20 moles per mole of total aromatic reactants; terminating the reaction when from about 1.0 to about 1.5 moles of hydrogen chloride have been evolved per mole of total aromatic reactants; hydrolyzing the resultant reaction product to form a mixture of an acidic aqueous layer and organic material comprising xylene-phenol-ethylene dichloride reaction product; reacting said mixture with a molar amount of formaldehyde approximately equal to that of the charged phenol, at a temperature of from about 60° to about 150° C. to form a resinous condensation product; and recovering said condensation product.

13. A process for producing a resin which comprises reacting xylene, anisole, and ethylene dichloride in the presence of aluminum chloride at a temperature of from about 50° to about 100° C.; the amount of aluminum chloride being at least 5 mole per cent more than the molar amount of anisole, the molar amount of said xylene being at least 10% of the total reactants, the molar amount of said anisole being from about 0.1 to about 0.5 of the total aromatic reactants, and the amount of said ethylene dichloride being from above one to about twenty moles per mole of total aromatic reactants; terminating the reaction when from about 1.0 to about 1.5 moles of hydrogen chloride have been evolved per mole of total aromatic reactants; hydrolyzing the resultant reaction product to form a mixture of an acidic aqueous layer and organic material comprising xylene-anisole-ethylene dichloride reaction product, reacting said mixture with a molar amount of formaldehyde approximately equal to that of the charged anisole, at a temperature of from about 60° to about 150° C. to form a resinous condensation product; and recovering said condensation product.

14. The resin produced according to the process of claim 1.

15. The resin produced according to the process of claim 12.

16. The resin produced according to the process of claim 13.

HERMAN S. BLOCH.

REFERENCES CITED

The following references are of record in the file of this patent:

UNITED STATES PATENTS

| Number | Name | Date |
|---|---|---|
| 2,416,218 | Reiff | Feb. 18, 1947 |
| 2,453,298 | Bloch | Nov. 9, 1948 |